United States Patent
Meyer et al.

(10) Patent No.: US 10,858,511 B2
(45) Date of Patent: Dec. 8, 2020

(54) PROCESS FOR PRODUCING A BIOPLASTICS PRODUCT

(71) Applicant: SPC Sunflower Plastic Compound GmbH, Garrel (DE)

(72) Inventors: Sebastian Meyer, Herner (DE); Ulrich Meyer, Garrel (DE); Reinhard Trumme, Dinklage (DE); Christina Simeone, Steinfurt (DE); Stephan Albers, Dinklage (DE)

(73) Assignee: SPC Sunflower Plastic Compound GmbH, Garrel (DE)

( * ) Notice: Subject to any disclaimer, the term of this patent is extended or adjusted under 35 U.S.C. 154(b) by 10 days.

(21) Appl. No.: 16/096,393

(22) PCT Filed: Apr. 25, 2017

(86) PCT No.: PCT/EP2017/059835
§ 371 (c)(1),
(2) Date: Oct. 25, 2018

(87) PCT Pub. No.: WO2017/186743
PCT Pub. Date: Nov. 2, 2017

(65) Prior Publication Data
US 2019/0144664 A1    May 16, 2019

(30) Foreign Application Priority Data
Apr. 25, 2016    (DE) .......................... 10 2016 107 654

(51) Int. Cl.
| | | |
|---|---|---|
| *C08K 7/02* | (2006.01) | |
| *C08L 67/02* | (2006.01) | |
| *B29C 45/00* | (2006.01) | |
| *C08L 99/00* | (2006.01) | |
| *B65D 85/804* | (2006.01) | |
| *B29B 7/00* | (2006.01) | |
| *B65D 65/46* | (2006.01) | |
| *B29C 45/16* | (2006.01) | |
| *B29K 67/00* | (2006.01) | |
| *B29B 7/90* | (2006.01) | |
| *B29B 7/40* | (2006.01) | |
| *B29B 7/46* | (2006.01) | |
| *B29K 511/00* | (2006.01) | |
| *A01G 9/02* | (2018.01) | |
| *B29L 31/00* | (2006.01) | |

(52) U.S. Cl.
CPC ............ *C08L 67/025* (2013.01); *B29B 7/007* (2013.01); *B29C 45/0001* (2013.01); *B29C 45/1642* (2013.01); *B65D 65/466* (2013.01); *B65D 85/8043* (2013.01); *C08K 7/02* (2013.01); *C08L 99/00* (2013.01); *A01G 9/021* (2013.01); *B29B 7/40* (2013.01); *B29B 7/46* (2013.01); *B29B 7/90* (2013.01); *B29K 2067/04* (2013.01); *B29K 2511/00* (2013.01); *B29K 2995/006* (2013.01); *B29K 2995/0067* (2013.01); *B29L 2031/7132* (2013.01); *B29L 2031/7136* (2013.01); *B29L 2031/7174* (2013.01); *C08K 2201/005* (2013.01); *C08K 2201/018* (2013.01); *C08L 2201/06* (2013.01); *Y02W 90/12* (2015.05); *Y02W 90/13* (2015.05)

(58) Field of Classification Search
USPC ......................................... 523/128
See application file for complete search history.

(56) References Cited

U.S. PATENT DOCUMENTS

2012/0097602 A1    4/2012   Tedford

FOREIGN PATENT DOCUMENTS

| DE | 10 2007 017 321 | 10/2007 |
|---|---|---|
| DE | 10 2013 208 876 | 11/2014 |
| DE | 10 2013 216 309 | 2/2015 |
| FR | 2 940 297 | 6/2010 |
| WO | WO 2013/072146 | 5/2013 |
| WO | WO 2014/184273 | 11/2014 |

OTHER PUBLICATIONS

International Search Report for Application No. PCT/EP2017/059835 dated Aug. 9, 2017.

*Primary Examiner* — Terressa Boykin
(74) *Attorney, Agent, or Firm* — Haug Partners LLP

(57) ABSTRACT

A process for producing a biomaterial product based on sunflower seed hulls/sunflower seed husks comprising providing or producing a sunflower plastic compound (SPC) compounded material (SPC PBS, SPC PBSA), wherein the material is obtained by compounding a sunflower seed hull material/sunflower seed husk material with a biodegradable plastic, for example polybutylene succinate (PBS), polybutylene succinate-adipate (PBSA), or the like. The SPC compounded material is preferably used for producing an injection molded product, for example biodegradable containers, packagings, films or the like, in particular coffee capsules, tea capsules, urns, cups, plant pots, flowerpots, or the like.

15 Claims, 8 Drawing Sheets

PROCESS FOR PRODUCING A BIOPLASTICS PRODUCT

The present application claims priority from International Patent Application No. PCT/EP2017/059835 filed on Apr. 25, 2017, which claims priority from German Patent Application No. DE 10 2016 107 654.6 filed on Apr. 25, 2016, the disclosures of which are incorporated herein by reference in their entirety.

FIELD OF THE INVENTION

It is noted that citation or identification of any document in this application is not an admission that such document is available as prior art to the present invention.

Biodegradable materials have been known for some time and biodegradable plastics are also known. These include inter alia also polybutylene succinate, PBS for short, a biodegradable bioplastic produced from butanediol (e.g., bio-BDO) and succinic acid which is also obtainable in a bio-based fashion.

The same class of biodegradable plastics also includes polybutylene succinate adipate (PBSA) in which not only succinic acid but also adipic acid is incorporated by polymerization. This plastic too may be bio-based to a greater or lesser extent depending on monomer origin.

DE 10 2007017321 discloses a multilayer film and a process for the production thereof and one of the variants disclosed in this application also employs a thermoplastic polyester such as for example PBS which is employed alone or in combination with other thermoplastic polyesters.

The hitherto known biodegradable plastics—this also applies to PLA (polylactic acid)—are known but remain relatively costly in their production and also in their processing, injection molding of an end product in particular requiring a relatively long machine cycle time.

DE 10 2013 216 309 A1, DE 10 2013 208 876 A1, WO 2013/072146 A1 disclose a biocomposite/biomaterial comprising sunflower seed hulls/husks, wherein a PLA is employed as the plastics component.

In addition, the measures required to adjust certain physical properties, for example brittleness, elasticity, elastic modulus, strength etc., are relatively laborious and expensive in the case of such biodegradable plastics.

SUMMARY OF THE INVENTION

The invention has for its object to reduce or even entirely avoid the existing disadvantages.

In the invention the known-per-se polybutylene succinate (PBS), PBSA or the like is compounded together with sunflower hull fibers (these may also be sunflower seed husk fibers) (also referred to hereinbelow as SPC PBS or $S^2PC$ PBSA).

Since the sunflower hull fibers are a pure bioproduct—the sunflower hulls surround the oil-containing core of a sunflower seed—the processing of the sunflower hull fibers requires merely hulling the seed, comminution (e.g. by a milling process) of the hull material to the desired particle size and drying to a particular moisture content and deoiling (reduction) to a desired oil/fat content.

Comminution of the sunflower hull fiber is carried out by a milling process, wherein the particle size is in the range of 3 mm or less, preferably in the range from 0.01 mm to 1 mm, particularly preferably in the range from 0.1 mm to 0.3 mm.

The abovementioned particle size indications are to be understood as meaning that at least a desired percentage, for example 80% or more, of the fiber material has the indicated particle size and only small proportions are outside the desired particle size range.

The compounding of the sunflower hull material with the PBS material in an extruder, for example a twin-screw extruder, forms a compound which is injection-moldable and exhibits an elastic modulus and/or a tensile strength in the end-biomaterial product that is markedly elevated compared to a biomaterial product made of pure PBS and exhibits further better properties.

A particular field of application of the invention is in the production of biodegradable packagings/containers such as for example coffee capsules, flowerpots, bags, boxes etc.

Above all, the invention can markedly reduce production costs compared to the use of pure PBS, for example by more than 10 percent. The reason for this is that sunflower hull fiber and the processing thereof is markedly more cost-effective than the production of the PBS material. Since sunflower hull fiber is also thermally stable up to a temperature of 200° C. no negative sensory effects on a coffee product occur when said product is produced in a coffee capsule according to the invention under relatively high pressure and/or high temperature in a coffee machine correspondingly suitable therefor.

Since the sunflower hull fiber effectively provides "biofiber reinforcement" for the plastic the wall thicknesses of the capsule may also be able to be reduced compared to pure PBS material, thus reducing the amount of PBS employed per container, packaging, coffee capsule etc. and resulting in a further cost saving.

The invention is hereinbelow elucidated with reference to an exemplary embodiment.

The exemplary embodiments relate to a biodegradable coffee capsule/to a biodegradable and thus compostable plant container (plant pot) but are extendable to any biodegradable and thus compostable packaging, container or the like.

DETAILED DESCRIPTION OF EMBODIMENTS

Figure 1:
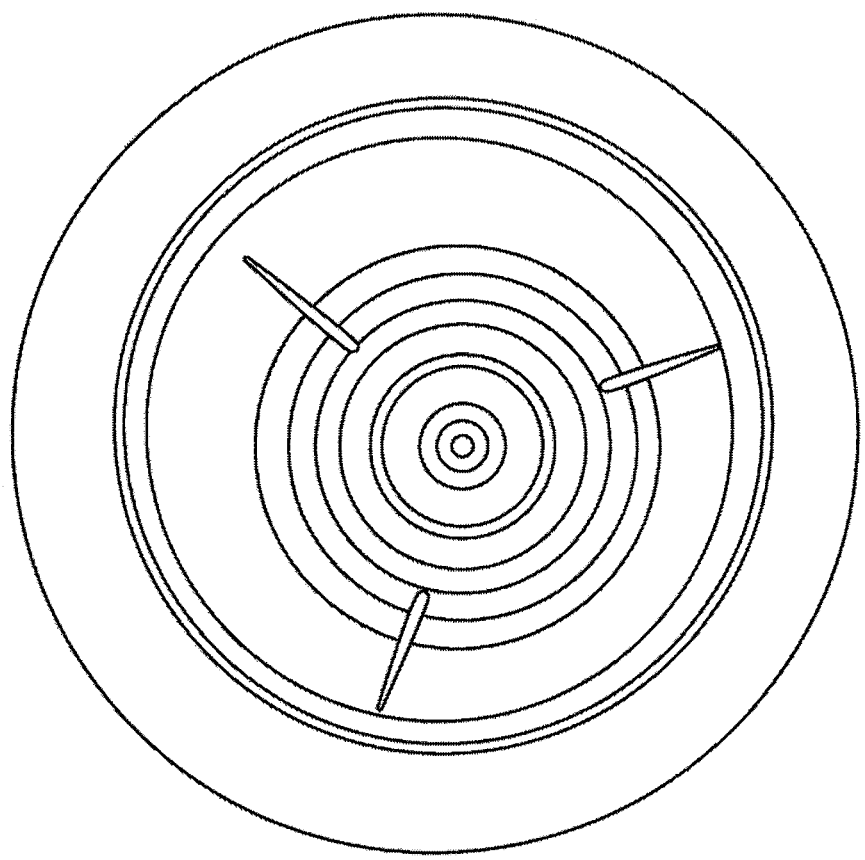
FIGS. 1 to 4 show various views of an inventive Nespresso-type coffee capsule.
Figure 2:
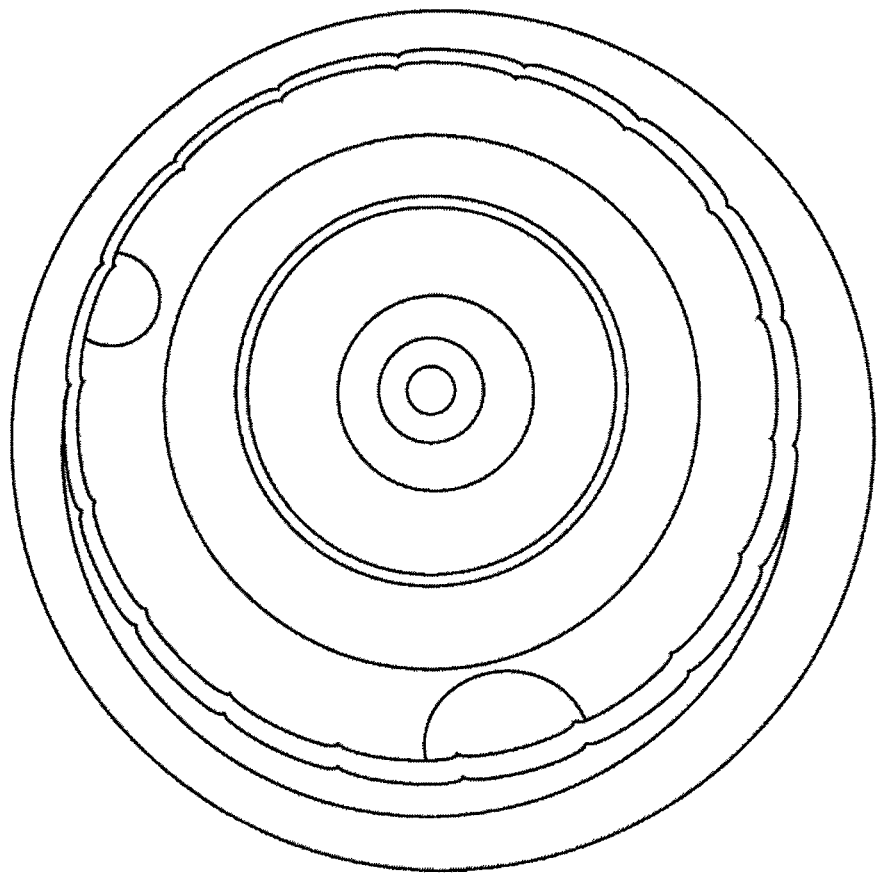
Figure 3:
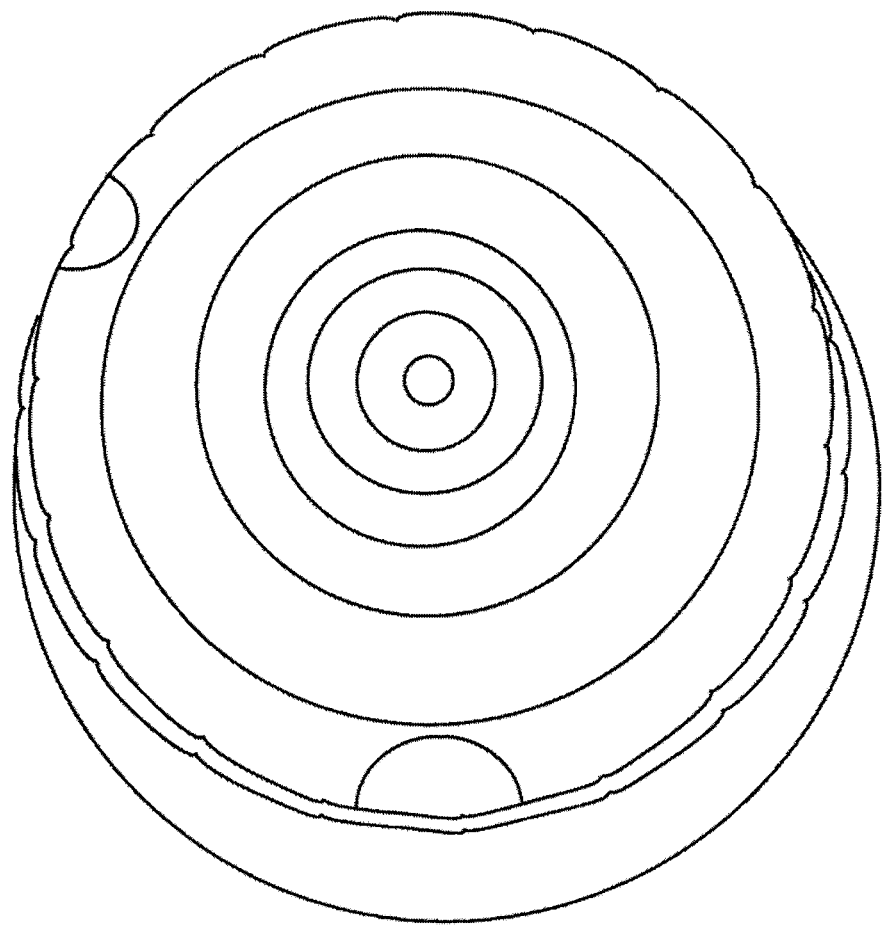

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

For the Tassimo-type coffee capsule a material formulation according to table 1 was used while for the Nespresso-type coffee capsule a material composition according to table 2 was used.

It is apparent from both tables that 69% of the coffee capsule material was formed by a bio-PBS FZ71PM (data sheet enclosed) and 30% of the compounding material was formed by hull flour (particle size <0.5/0.2 mm) with further use of an additive (adhesion promoter), namely Licocene PP MA 7452.

Data for the employed bio-PBS FZ71PM may be found in the technical data sheet at the end of the present description.

Further material data, in particular physical parameters concerning the inventive material $S^2PC$ 3071 MI (for the Tassimo-type coffee capsule) and $S^2PC$ 3071 MIF (for the Nespresso-type coffee capsule), may be found in the likewise-enclosed material data sheets.

A number of values stand out in particular here, for example the value for the elastic modulus, tensile strength, etc.

The elastic modulus for pure PBS as hitherto reported is in the range from 300 to 700 MPa while by contrast the elastic modulus for the inventive biomaterial SPC PBS/PBSA—see relevant material data sheets in table 3 and 4—is above 1200 MPa, for $S^2PC$ 3071 MIF is about 1300 MPa and for $S^2PC$ 3071 MI is in fact 1468 MPa (SPC=Sunflower Plastic Compound).

The better elastic modulus allows the material to be more readily pierced with spikes or water pressure. The holes in the material formed by the spikes or water pressure are important for coffee capsules and (for conventional capsules) are known.

Increasing the sunflower hull fiber proportion in the compound allows the elastic modulus to be enhanced yet further.

For plant pots as likewise claimed here in the application and in the invention the elastic modulus required is currently at least 1150 MPa and cannot be achieved by a pure PBS material.

It will be appreciated that it remains within the scope of the invention when the proportion of the sunflower hull flour on the one hand and of the PBS on the other hand is varied. The ratios of PBS (69%) to hull flour (30%) reported in the tables in this application are to be understood as merely exemplary and deviations therefrom (+/−1-25%) are possible at any time and are in the purview of the invention.

The quantity fraction (weight percentages) of the adhesion promoter, i.e. of the additive Licocene PP MA 7452, may also be altered without departing from the invention and other comparable adhesion promoters may also be employed.

The special property of the inventive biomaterial formed from sunflower hull flour on the one hand and PBS on the other hand is that said material is completely biodegradable, i.e. compostable. Specifically this means that "home compostability" has been achieved since the thus-produced material may be completely biodegraded by an appropriate biological environment (compost or ground/earth).

The material according to the invention also has the advantage that the cycle time within which in an injection molding process, i.e. when the inventive compound is used in an injection molding plant to produce a corresponding end product, i.e. for example a coffee capsule or a plant pot or the like. Thereby the time within which the material is injected and then removed in the injection molding plant may be shortened markedly, i.e. by up to 5% to 10% or more, thus markedly increasing the performance capability of the entire injection molding process on an existing production facility and thus also again resulting in cost savings.

For home compostability and optimal degradability in the ground of the entire extruded end product the invention also provides the sunflower hull flour as a natural humus material so that the biodegradation process altogether also precedes more rapidly than before since the bacteria and microorganisms on which composting is dependent can digest the overall material more easily by initially being able to colonize predominantly the sunflower hull flour before later digesting the remaining material.

The inventive biomaterial also makes it possible to achieve a markedly higher heat distortion resistance since this is 97° C. compared to 95° C. for pure PBS. This is a particular advantage since at the required water temperature for the coffee capsules of at least 90 degrees Celsius every degree Celsius of improved heat distortion resistance is desirable because it altogether contributes to the coffee capsule being sufficiently stable also in the coffee production process and especially in no way contributes to (negative) flavor degradation of the coffee product.

When reference is made in the present application to hull flour, i.e. the flour made of sunflower hulls/husks, this is produced from the sunflower hull material by an appropriate milling process, for example an impact mill, by means of which the hull material is brought to the desired particle size/fiber length, for example 0.5 mm, 0.2 mm or the like.

The oil content in the hull material of the SPC PBS material is markedly below 10 percent, for example as a result of deoiling 6 percent or less, and the residual moisture in the compound material is as a result of drying below 1 percent, preferably about 0.05 percent (or less but 0.1% to 0.5% is still acceptable).

It is also within the scope of the invention when instead of PBS a further biodegradable plastics component and if required also a further biofiber, for example wood fiber, is added to the sunflower fiber-PBS compound. For example an initial test has shown that when a wood fiber, hemp or flax fiber is likewise reduced to the same scale such as for example a particle size/fiber length of 0.1-0.5 mm and accounts for 5-10% of the overall product the physical, biological and chemical properties of the inventive SPC-PBS material are not drastically altered and in any case are not substantially impaired. Further research may reveal further preferred biomaterials which may be optimally compounded with the sunflower hull material and the PBS/PBSA material, care always having to be taken to ensure that the added biomaterial does not reach its thermal limit in the compounding process and possibly undergo scorching/carbonization or other degradation.

As mentioned the invention of the present application also comprises the production of a film as a biomaterial product based on sunflower seed hulls/sunflower seed husks with further use of PBS, PBSA or the like.

This film according to the invention may be produced with known film production machines (normal single-screw extruders). The thickness may be between about 200 μm and 1000 μm, an embodiment of about 300 μm being particularly preferred. The film according to the invention has the feature that it is filled with 35% sunflower hull flour (the hull flour has a fiber length/particle size of <200 μm) and in addition with 30% of a mineral filler, for example but not exclusively with kaolin.

Figure 4:
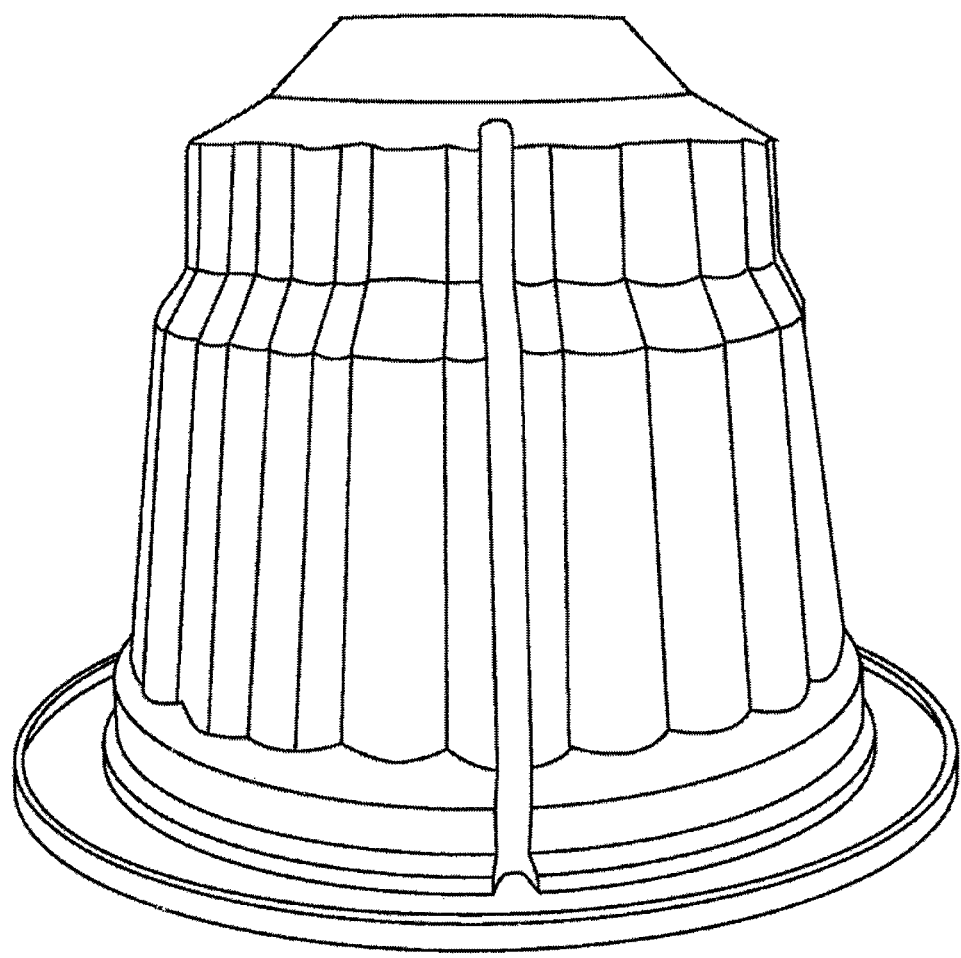
Figure 5:
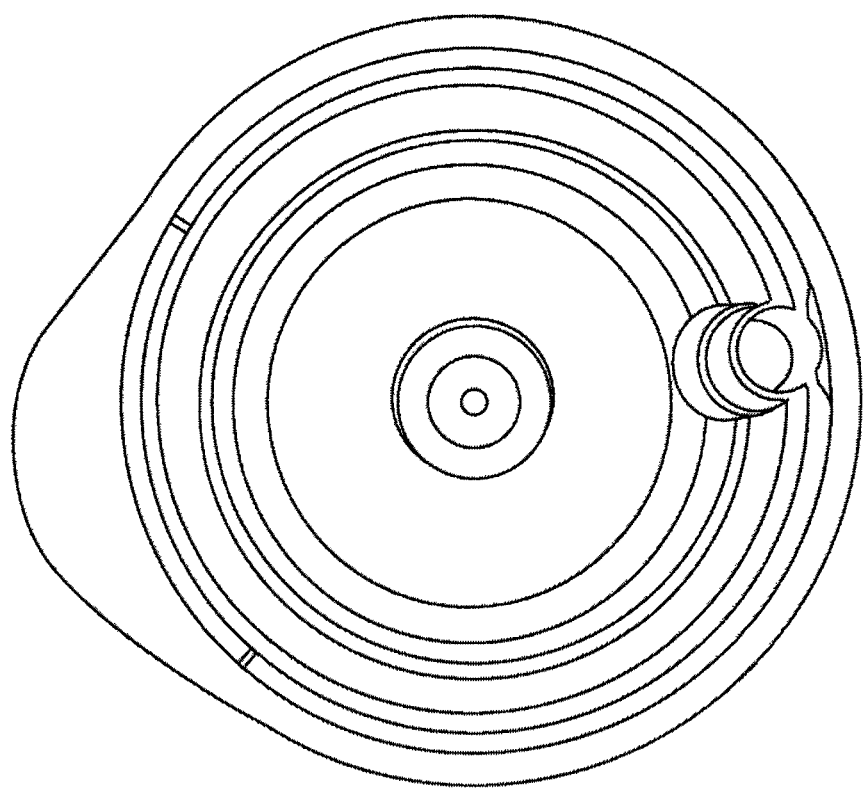
FIGS. 5 and 6 show various views of an inventive Tassimo-type coffee capsule.
Figure 6:
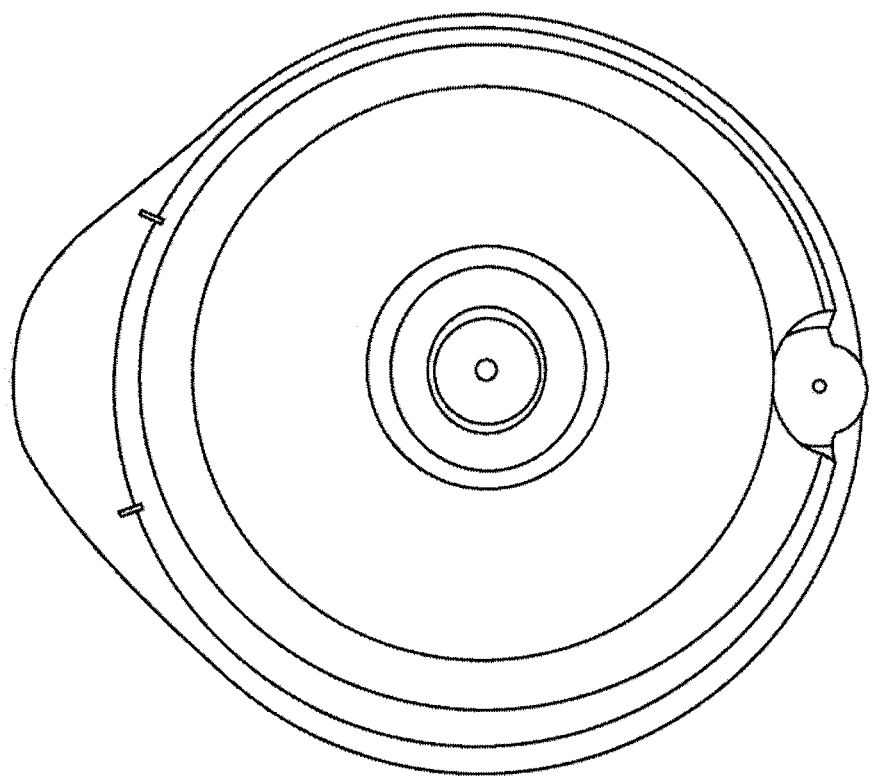

When used as for example a 300 μm-thick sealing film for coffee capsules (for example of the Nespresso-type or the like) this film shows a particularly desirable breaking behavior. This film can be used to ensure that said film breaks only as a result of the water pressure (at predetermined, pre-engraved sites) of the coffee machine in the capsule. This is not possible with a conventional plastics film (for example made of PE, PVC, PP or the like) without filler since these are generally too elastic and can therefore withstand the pressure of the water. The sealing film used in coffee capsules is often thinner than the wall region (also producible from film, for example by injection molding or deep drawing process) which forms the lower part of the coffee capsule (including spout) as the receiving vessel/cup for the coffee/tea material (see FIG. 4 in side view, FIG. 1 in top view), a material thickness of for example about 500 μm (or less) being entirely sufficient for the wall region, this material thickness being individually adjustable however.

For these reasons many coffee capsules have hitherto also employed as the top closure a thin aluminum foil (that is prestamped) and thus has intended-breakage sites breakable by the water pressure at predetermined sites. Such capsules compatible with the Nespresso-type for example from third-party suppliers likewise employed aluminum foils. However, such a coffee capsule is not compostable because aluminum shows no composting behavior/degradation behavior in the ground but on the contrary would in fact contaminate a compost.

When such capsules are advertised with the terms "bio" or "compostable" various papers/paper types are also used. However, the disadvantage of these papers is that they exhibit no barrier activity against oxygen and the quality of the coffee powder in the capsule thus suffers rapidly. The coffee capsule according to the invention, which is provided at the top and/or around the circumference with a film according to the invention, is therefore notable for its very good oxygen barrier activity. This oxygen barrier activity is <50 cm$^3$/m$^2$*d*bar. The abovementioned unit means that less than 50 cm$^3$ of oxygen per day (d) penetrate a square meter (of film material) at one bar of pressure.

When the film is produced in a multilayer composite in which an interlayer of about 30 μm of PVOH or "G-Polymer" is employed the film can achieve a barrier activity of up to 0.4 cm$^3$/m$^2$*d*bar.

It is thus immediately apparent that the barrier activity of the films according to the invention is drastically improved in the multilayer composite with a PVOH interlayer.

A "G-Polymer" is a modified PVOH material which may be used with particular advantage in a multilayer composite in which the film material is formed from the biomaterial according to the invention. G-Polymer is obtainable from Nippon Gohsei and is also known as "Nichigo-G-Polymer"-Amorphous Vinyl Alcohol Resin" and described at http://www.nippon-gohsei.com/nichigo-g-polymer.

The production of multilayer films for use in coffee capsules is already known and such films are produced in a multilayer process. Such multilayer processes are also applicable to the film according to the invention using the S$^2$PC-PBS material. To this end the coffee capsule is produced in a co-injection process (as known for example from WO 2016/071036 or EP 1576 6515) in which the barrier layer consists of PVOH or G-Polymer. This likewise makes it possible to achieve very high oxygen barrier values. This represents a preferred embodiment of the invention when the compound according to the invention consisting of sunflower hull flour on the one hand together with SPC PBS/PSA on the other is used.

Figure 9:
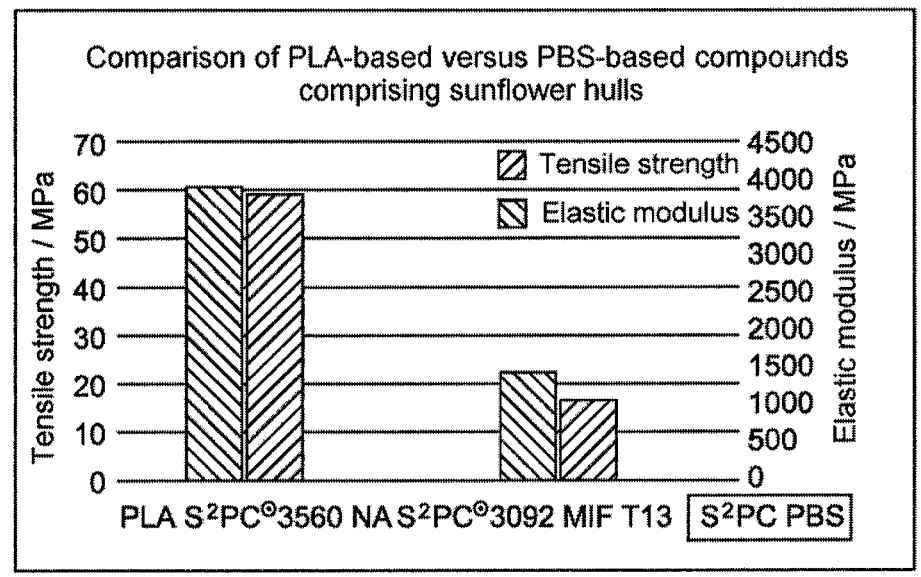
FIGS. 9 and 10 show two tables that show a comparison in which various physical parameters of an SPC-PLA material are compared to an SPC PBS material.
Figure 10:
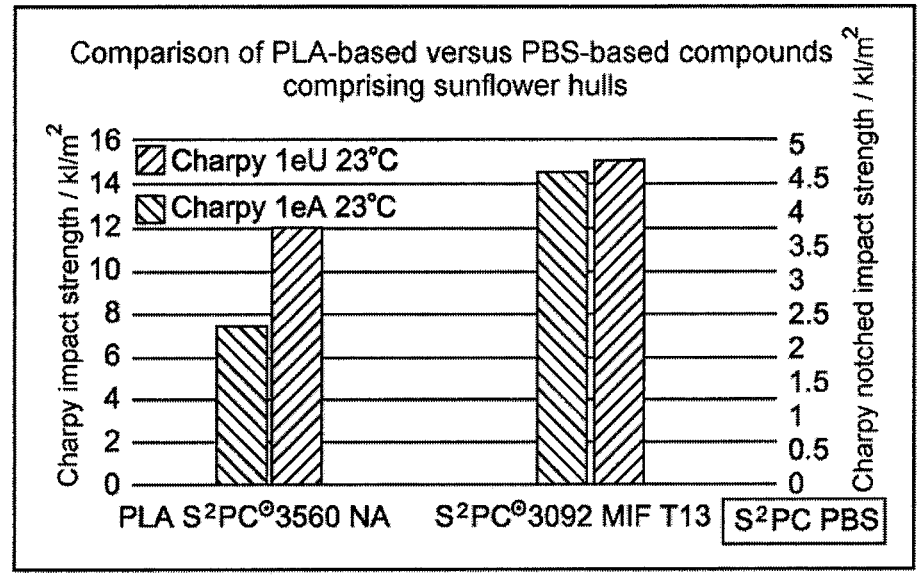

The tables in FIGS. 9 and 10 show a comparison in which various physical parameters of an SPC-PLA material are compared to an SPC PBS material according to the invention.

These tables show that an SPC PLA (left-hand side of table in each case) is inclined to a very brittle compound which is, however, simultaneously very stiff while the SPC PBS variant according to the invention (referred to in the table as S$^2$PC 3092 MIFT13) surprisingly exhibits a markedly softer (lower) elastic modulus and a lower tensile strength coupled with a higher impact strength than SPC PLA.

It is finally also specifically noted that an SPC PLA material has a heat distortion resistance of only about 55° Celsius and is therefore of only limited use for application in a coffee capsule (the hot water is often forced through the coffee capsule by the coffee machine at a temperature of about 90°±3° Celsius) while the SPC-PBS material according to the invention exhibits a heat distortion temperature of greater than 90° Celsius and is thus markedly more suitable, the coffee capsule remaining stable during coffee production.

Precisely because of the particularly high heat distortion temperature of the SPC-PBS material according to the invention (which is higher than for pure PBS) the material may also be used to produce a container suitable for receiving relatively high-temperature liquids/foodstuffs, for example coffee, tea, soup, noodles etc.

Figure 7:
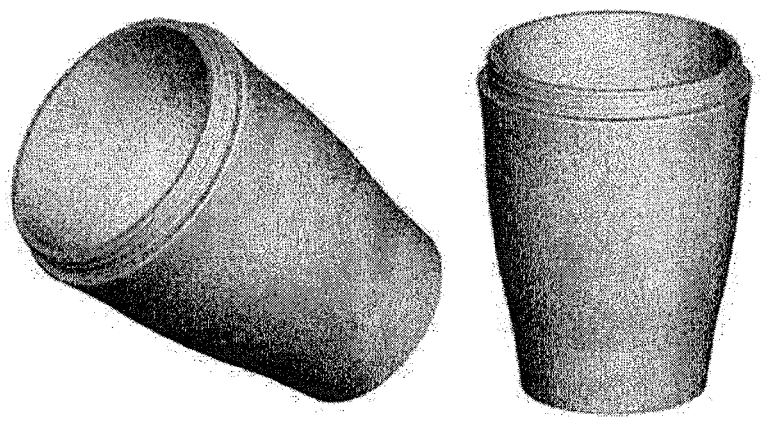
FIGS. 7 and 8 show a corresponding cup with a cup container.
Figure 8:
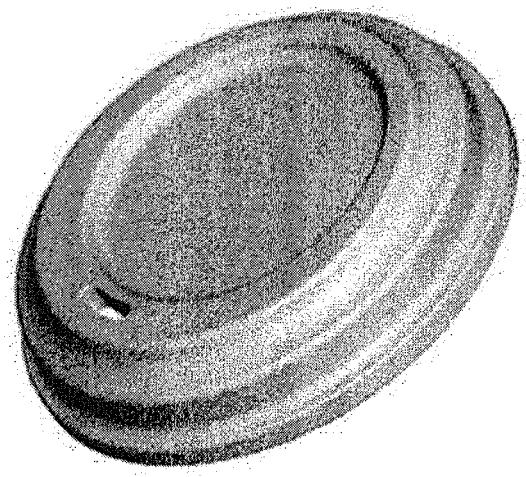

FIGS. 7 and 8 show a corresponding (coffee) cup (FIG. 7) with a cup container (FIG. 8). The height of the cup may be between 100 and 250 mm, a diameter of 90 mm is readily possible and also a volume of 300 ml or more is readily achievable and a test showed that the cup remains very stable despite being filled with hot coffee or tea; this cup is also reusable, is very easy to clean after use (is also dishwasher safe) and, above all, is home-compostable in contrast to existing plastic cups.

Although there are already corresponding plastic cups made of bioplastics that are advertised as compostable these do not feature home compostability but rather feature only industrial compostability meaning that the cups can be composted in an industrial process under very particular conditions (and with addition of further decomposition agents) only on an industrial scale and not in the manner of the container/cup according to the invention which is residuelessly decomposed in nature on a compost heap within a short space of time and can accordingly be classed as home-compostable.

When reference is made in the present application to a coffee capsule this is naturally also to be understood as also meaning any other application using capsules, for example tea capsules, soup capsules etc.

The outstanding biodegradable, home-compostable properties of the S$^2$PC-PBS material according to the invention also allow this material to be used for urns (funeral urns). The compound material is then used to manufacture, by appropriate production methods, for example deep drawing, stamping, injection molding, etc., the urn into which the ash may then be filled. After initial tests it is believed that complete dissolution of the material in the ground (depth about 50-100 cm) is fully achieved after as little as 5 years (outstanding ground-degradability of the inventive SPC PBS/SPC PBSA) leaving no contamination residues behind in the ground.

Finally, reference is also made to the preferred use of the SPC PBS material in forestry protection. When young plants are planted individually it must be ensured that the plants are protected from browsing especially by roe deer and other hoofed game animals. This has hitherto been achieved with wire mesh or plastic enclosures arranged around the juvenile plant in order that said plant can reach its terminal height with as little disturbance as possible without being damaged by game animal browsing. The problem with existing tree protection measures (there are also many tree protection plastics materials such as for example plastics tapes that are wrapped around the plants to form spirals, also plastics meshes etc.) is that this plastics material remains in nature but does not degrade with the result that it is also ingested by the game animal due to its play instinct and thus pieces of this plastics material may end up in the gastrointestinal tract of the game animal and harm the animal. By using the SPC PBS/PBSA material according to the invention the entirety of the material degrades completely within just a few years and also cannot result in harm to the gastrointestinal tract of game animals.

The use of the inventive biomaterial product made of SPC PBS and consisting of sunflower hull material on the one hand and PBS material compounded therewith on the other hand for producing tree spirals and mechanical plant and browsing protection etc. thus also has the advantage that the material need not necessarily be removed from the existing forest again after its attachment around the plants because it dissolves by itself within just a few years by composting.

When reference is made in the present application to mechanical game animal browsing protection this is to be understood as meaning all relevant products such as tree spirals, tree protection meshes, growth protectors as protection for young trees, plants, vines and the like.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

TABLE 1

| Description | % | Amount | Unit |
| --- | --- | --- | --- |
| Bio PBS FZ71PM | 69.00 | 690 | Kg |
| Hull flour LGM 3 (<0.5 mm) | 30.00 | 300 | Kg |
| Licocene PP MA 7452 | 1.00 | 10 | Kg |

TABLE 2

| Description | % | Amount | Unit |
| --- | --- | --- | --- |
| Bio PBS FZ71PM | 69.00 | 690 | Kg |
| Hull flour LGM 3 (<0.2 mm) | 30.00 | 300 | Kg |
| Licocene PP MA 7452 | 1.00 | 10 | Kg |

TABLE 3

Material data sheet　　　　　　　$S^2PC$ ® 3071 MIF
Free-flowing compound comprising 30% by weight of sunflower seed husk fibers.
Fibers from sunflower seed husks are a byproduct of sunflower oil production. They are GMO-free, are non-competitive with foodstuffs and do not require additional cropland. $S^2PC$ ® has a lower carbon footprint than comparable materials.

| Property | Standard | Unit | Value, dry |
| --- | --- | --- | --- |
| Mechanical properties | | | |
| Density | ISO 1183 | g/cm$^3$ | 1.3 |
| Elastic modulus | ISO 527 | MPa | 1468 |
| Tensile strength | ISO 527 | MPa | 24 |
| Breaking elongation, nominal | ISO 527 | % | 6.4 |
| Charpy unnotched$_{23°\,C.}$ | ISO 179/1eU | kJ/m$^2$ | 16.51 |
| Charpy notched$_{23°\,C.}$ | ISO 179/1eA | kJ/m$^2$ | 4.23 |
| Thermal properties | | | |
| Heat distortion temperature | ISO 75-1 (0.45 MPa) | °C. | 97 |
| Processing conditions | | | |
| Injection molding melt temperature | | °C. | 180-190 |
| Mold temperature | | °C. | 20-60 |
| Drying temperature | | °C. | 80 |
| Drying time | | h | 4 |
| Maximum residual moisture | | % | 0.04 |

TABLE 4

Material data sheet　　　　　　　$S^2PC$ ® 3071 MIF
Free-flowing compound comprising 30% by weight of sunflower seed husk fibers.
Fibers from sunflower seed husks are a byproduct of sunflower oil production. They are GMO-free, are non-competitive with foodstuffs and do not require additional cropland. $S^2PC$ ® has a lower carbon footprint than comparable materials.

| Property | Standard | Unit | Value, dry |
| --- | --- | --- | --- |
| Mechanical properties | | | |
| Density | ISO 1183 | g/cm$^3$ | 1.3 |
| Elastic modulus | ISO 527 | MPa | 1300 |
| Tensile strength | ISO 527 | MPa | 18 |
| Charpy unnotched$_{23°\,C.}$ | ISO 179/1eU | kJ/m$^2$ | 19 |
| Charpy notched$_{23°\,C.}$ | ISO 179/1eA | kJ/m$^2$ | 4.9 |
| Thermal properties | | | |
| Heat distortion temperature | ISO 75-1 (0.45 MPa) | °C. | 97 |
| Processing conditions | | | |
| Injection molding melt temperature | | °C. | 180-190 |
| Mold temperature | | °C. | 20-60 |
| Drying temperature | | °C. | 80 |
| Drying time | | h | 4 |
| Maximum residual moisture | | % | 0.04 |

The invention claimed is:

1. A process for producing a biomaterial product based on sunflower seed hulls/sunflower seed husks comprising:
   providing or producing a compounded material, wherein the compounded material is obtained by compounding a sunflower seed hull material with a biodegradable material such that the biodegradable material becomes a home-compostable material.

2. The process as claimed in claim 1, further comprising:
   utilizing the compounded material to produce the biodegradable material;
   wherein the biomaterial product is selected from the group consisting of biodegradable packagings, coffee capsules, tea capsules, containers, plant pots, urns, browsing protection, cups, flowerpots, and films.

3. The process as claimed in claim 2, further comprising:
   processing the compounded material in an injection molding process to produce the at least one product.

4. A biomaterial product produced by the process as claimed in claim 1.

5. The biomaterial product as claimed in claim 4;
wherein the biomaterial product is an injection molded product produced from the compounded material; and
wherein the proportion of the sunflower seed hull material in the compounded material is at least 10% by mass.

6. A process for producing a biomaterial product based on sunflower seed hulls/sunflower seed husks comprising:
providing or producing a compounded material, wherein the compounded material is obtained by compounding a sunflower seed hull material with a biodegradable plastic;
wherein the biomaterial product is constructed with a first layer, a second layer, and an interlayer arranged between the first and second layers,
wherein the first layer and the second layer comprise the compounded material; and
wherein the interlayer comprises an oxygen barrier layer having an oxygen barrier activity of <50 $cm^3/m^2*d*bar$.

7. The process as claimed in claim 1;
wherein the biodegradable material is polybutylene succinate (PBS) or polybutylene succinate-adipate (PBSA).

8. The biomaterial product as claimed in claim 4;
wherein the biomaterial product is a container, packaging, or film.

9. The biomaterial product as claimed in claim 4;
wherein the biomaterial product is a coffee capsule, tea capsule, plant pot, flowerpot, film, cup, or urn.

10. The biomaterial product as claimed in claim 5;
wherein the proportion of the sunflower seed hull material in the compounded material is 30% by mass or more.

11. The biomaterial product as claimed in claim 10;
wherein the proportion of the sunflower seed hull material in the compounded material is more than 50% by mass.

12. The biomaterial product as claimed in claim 6;
wherein the oxygen barrier layer has an oxygen barrier activity of <10 $cm^3/m^2*d*bar$.

13. The biomaterial product as claimed in claim 12;
wherein the oxygen barrier layer has an oxygen barrier activity of <1 $cm^3/m^2*d*bar$.

14. A process for producing a biomaterial product based on sunflower seed hulls/sunflower seed husks comprising:
providing or producing a compounded material,
wherein the compounded material is obtained by compounding a sunflower seed hull material with a biodegradable plastic,
wherein the biomaterial product is constructed with a first layer, a second layer, and an oxygen barrier layer,
wherein the first layer, and the second layer comprise the compounded material, and
wherein the oxygen barrier layer has an oxygen barrier activity of <50 cm3/m2*d*bar.

15. A process for producing a biomaterial product based on sunflower seed hulls/sunflower seed husks comprising:
providing or producing a compounded material,
wherein the compounded material is obtained by compounding a sunflower seed hull material with a home-compostable material,
wherein the biomaterial product is constructed with a first layer, a second layer, and an oxygen barrier layer,
wherein the first layer, and the second layer comprise the compounded material, and
wherein the oxygen barrier layer has an oxygen barrier activity of <50 cm3/m2*d*bar.

* * * * *